United States Patent [19]

Kaiser et al.

[11] 4,003,562
[45] Jan. 18, 1977

[54] LUBRICATED SPRING BEARING UNIT

[75] Inventors: Terrence S. Kaiser, Owosso; William A. Miller, Reese, both of Mich.

[73] Assignee: V. W. Kaiser Engineering, Inc., Millington, Mich.

[22] Filed: Oct. 23, 1973

[21] Appl. No.: 408,813

[52] U.S. Cl. .......................... 267/54 R; 267/54 B; 308/36.1; 308/98; 308/108; 308/114
[51] Int. Cl.² .................. F16C 11/12; F16C 33/74; F16F 1/28; F16J 15/34
[58] Field of Search ...................... 267/54 B, 54 R; 308/36.1, 120, 168, 98, 108, 114

[56] References Cited
UNITED STATES PATENTS

| | | | |
|---|---|---|---|
| 1,289,408 | 12/1918 | Davis | 308/120 |
| 2,191,528 | 2/1940 | Hewel | 267/54 R |
| 3,336,091 | 8/1967 | Ramsdell | 308/36.1 |
| 3,663,076 | 5/1972 | Valente | 308/36.1 |

*Primary Examiner*—Albert J. Makay
*Assistant Examiner*—Howard Beltran
*Attorney, Agent, or Firm*—Dale Austin Winnie

[57] ABSTRACT

A bearing unit including a sleeve internally mounting a spiral bushing which journals a bearing pin. At least one annular sealing ring is internally carried by the sleeve which rotatably receives and is sealed to the pin. A retaining ring, which is axially retained by the sleeve, axially retains the sealing ring.

12 Claims, 11 Drawing Figures

LUBRICATED SPRING BEARING UNIT

BACKGROUND OF THE INVENTION

Bearing units of the type disclosed herein may suitably be utilized to support a leaf spring assembly on a vehicle chassis. The bearing unit includes a bearing pin which passes through a spring eye on a leaf spring and is coupled to a shackle which in turn is coupled to a mounting bracket on the chassis by another identical bearing unit. The installation and replacement of prior art bearing units is time-consuming and relatively complicated. A disadvantage of one such prior art bearing unit is that it must be assembled in the field in a step-by-step procedure and, during assembly, a mechanic will frequently lose some of the bearing unit parts. Substantial down-time is thus incurred. Accordingly, it is an object of the present invention to provide a preassembled bearing unit which is easy to install in the field.

Bearing units of the type disclosed herein bear a substantial load, and thus it is important that the maximum bearing surface be provided between moving parts and that lubricant always be provided between the relatively moving bearing surfaces.

When introducing lubricant to bearing units which pass lubricant axially out both axial ends thereof, many mechanics will unfortunately, upon observing lubricant pass out one axial end of the bearing unit, frequently assume that the lubrication is complete and terminate the lubricating process. Frequently, although the lubricant passes out one axial end of the bearing unit, it does not pass to the other axial end and thus if introduction of lubricant is interrupted when lubricant passes out one end only, a portion of the bearing surface may not be adequately lubricated. Any such non-lubricated bearing pin portion rapidly wears. Accordingly, it is another object of the present invention to provide a bearing unit which will pass lubricant from one closed end to and through an opposite end to aid mechanics in determining when adequate lubrication has been completed.

Still another object of the present invention is to provide a bearing unit which will minimize human error in lubricating.

Yet another object of the present invention is to provide a bearing unit which is preassembled and includes a sleeve that internally receives a spiral bushing and internally mounts bearing pin sealing units at axially opposite ends of the spiral bushing.

It is another object of the present invention to provide a bearing unit of the type described having a sleeve internally receiving a pair of sealing units at opposite ends thereof, at least one of the sealing units preventing lubricant from passing thereby and including a resilient sealing ring which is rectangular in cross section.

A further object of the present invention is to provide a bearing unit of the type described including a pair of axially spaced, resilient sealing rings which sealingly engage a bearing pin and retaining rings which axially restrict movement of the sealing rings and are radially spaced from the bearing pin.

A still further object of the present invention is to provide a bearing unit of the type described, including a bearing pin receiving shell, resilient annular seals mounted in the shell, and end rings carried by the sleeve which prevent the seals from moving axially outwardly.

Another object of the present invention is to provide a bearing unit of the type described which prevents lubricant from passing out one end thereof and, at the other end, permits lubricant to pass axially, but inhibits the axially inward passage of foreign matter.

Other objects and advantages of the present invention will more readily be understood by reference to the accompanying drawings, in which.

Figure 1:
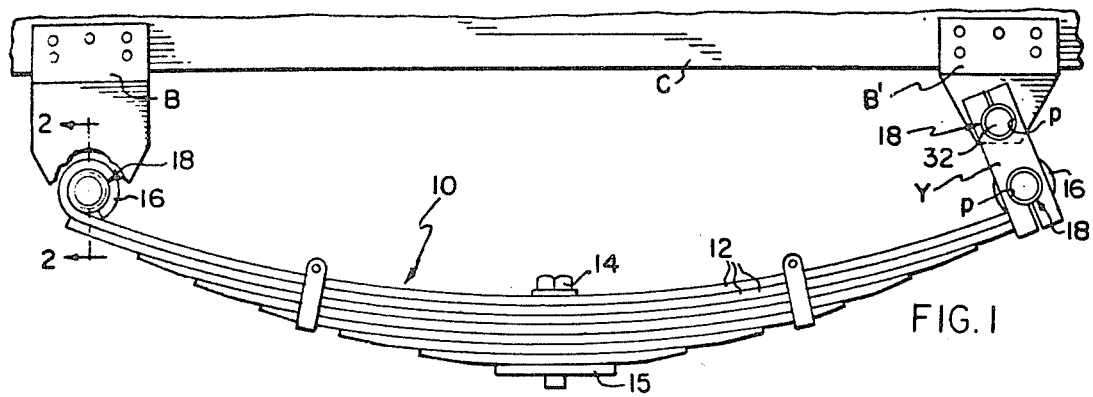
FIG. 1 is a side elevational view of a leaf spring assembly mounted on a vehicle chassis via a bearing unit constructed according to the present invention.

A bearing unit, generally designated 18 and constructed according to the present invention, is particularly adapted for mounting a spring assembly, generally designated 10, on a motor vehicle chassis, generally designated C. The spring assembly includes a stack of forged, spring leaves 12 coupled together via a bolt 14 and a bottom plate 15. The spring assembly 10 includes cylindrically shaped, integrally forged, spring eyes 16. One bearing unit 18 mounts the forward spring eye 16 on the chassis supported, front mounting bracket B. The rear spring eye 16 is mounted on a rear chassis supported mounting bracket B' by an H-shaped shackle or yoke Y having upper and lower sets of pin-receiving passages p therethrough. A second bearing unit 18 mounts the rear spring eye to the lower end of the shackle Y, whereas a third bearing unit 18 mounts the upper end of the shackle Y to the rear mounting bracket B'. The bearing units 18 are identical and each comprises a cylindrical, steel sleeve or shell 20 which, after the bearing unit 18 is assembled, is fixed to one of the spring eyes 16 or to the bracket B'. For example, the sleeve 20 may be press-fit into the spring eyes 16 via an air impact hammer (not shown). If the forged spring eye 16 has substantial imperfections and deformities, it may be necessary to machine the inside of the eye 16 prior to installation of the sleeve 20.

Figure 2:
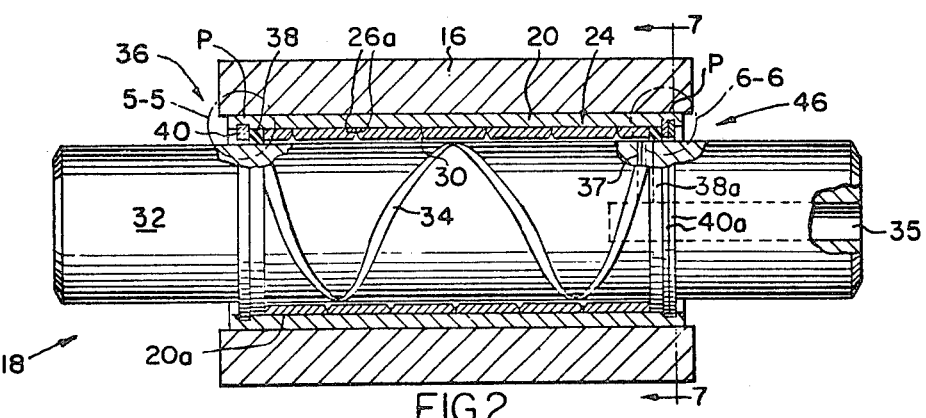
FIG. 2 is an enlarged, sectional, end view, taken along the line 2—2 of FIG. 1.

Disposed in the sleeve 20 is a spiral bushing, generally designated 24, including a helical strip 26 which normally has an outside diameter greater than the internal diameter of the sleeve 20 and is sprung into engagement with the internal wall 20a of the sleeve 20 and thereby held in place. As illustrated, the spiral bushing 24 is axially shorter than the sleeve 20 to provide enlarged diameter end portions P at each end of the bushing 24. The adjacent edges 26a of the strip 26 are internally chamfered to provide outwardly convergent surfaces which define a helical groove 30 for passing grease or lubricant L along the length thereof. To insert the spiral bushing 24 into the sleeve 20, the spiral bushing 24 is torqued to a smaller diameter and inserted into the sleeve 20 and the torque pressure is then released so that the coiled spiral bushing 24 will spring outwardly into tight engagement with the inside of the sleeve 20. As illustrated in FIG. 2, when the spiral bushing is mounted in the sleeve 20, the adjacent edges 26a of the strip are engaged with each other to provide a "tight wrap" of the spiral bushing so that maximum bearing surface, for a given axial length, will be provided. The bushing 24 is fabricated from high-grade, (i.e. high-chrome, high-carbon) tool steel which has excellent wear characteristics. The material for the sleeve 20 need not be of such high quality because the sleeve 20 is not subjected to the intensive rubbing that the spiral bushing 24 is subjected to.

Figures 3, 3A, 3B, 3C:
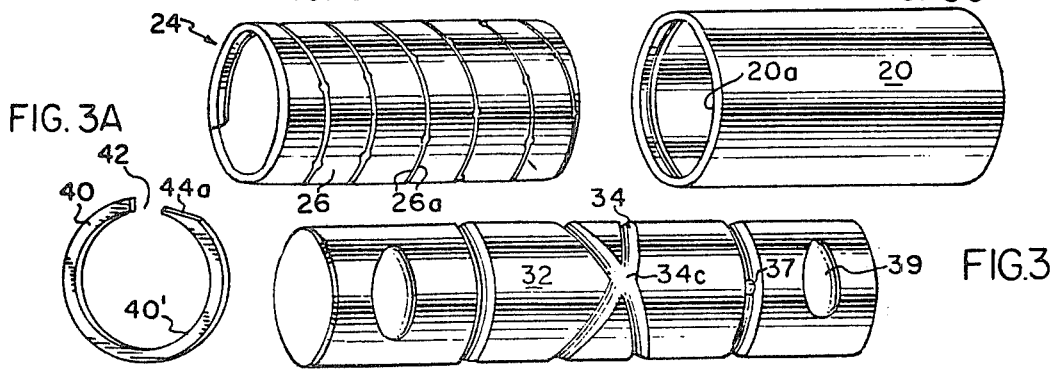
FIG. 3 is a perspective view of the pin.
FIG. 3A is a perspective view of snap ring used with the pin of FIG. 3.
FIG. 3B is a perspective view of the spiral bushing used about the pin of FIG. 3.
FIG. 3C is a perspective view of the sleeve which surrounds the spiral bushing of FIG. 3B.
Figure 4:
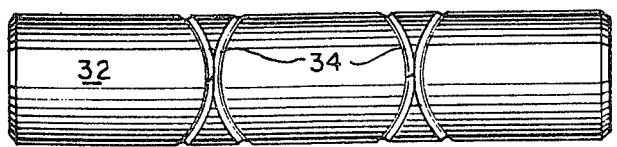
FIG. 4 is an enlarged, opposite side view of the bearing pin illustrated in FIG. 3.

The assembled sleeve 20 and spiral bushing 24 together comprise a shell for receiving a bearing pin, generally designated 32, rotatably mounted in the spiral bushing 24. The bearing pin 32 has a continuous groove 34 in its outer peripheral surface. The groove 34 has the configuration of the numeral 8 with the opposite sides of the groove 34 intersecting, as illustrated at 34c in FIG. 3. The external groove 34 on the pin 32 will cooperate with the internal groove 30 on the bushing 24 for passing lubricant L between the pin 32 and the bushing 26. The bearing pin 32 is notched at 39 for receiving, for example, the H-shaped mounting shackle, bracket, or yoke Y which mounts the pin 32 on the vehicle chassis C.

Figures 5, 6, 7, 8:
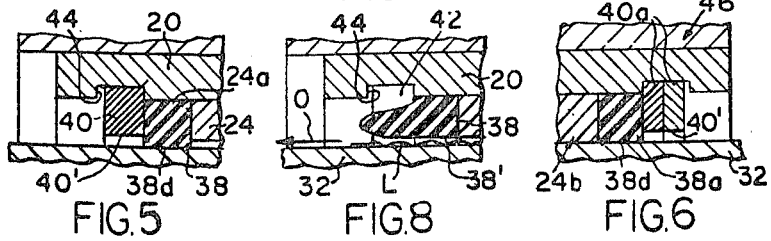
FIG. 5 is an enlarged view of the portion in the chain line circle 5—5 of FIG. 2.
FIG. 6 is an enlarged view of the portion in the chain line circle 6—6 of FIG. 2.
FIG. 7 is a sectional, end view of the bearing unit, taken along the line 7—7 of FIG. 2.
FIG. 8 is a sectional end view, similar to FIG. 5, but taken through a gap provided in a seal retaining snap ring.

For introducing lubricant L to a position between the spiral bushing 24 and the bearing pin 32, an axial passage 35 is provided in one end of the bearing pin 32 and communicates with a radial passage 37 communicating with one end of the sleeve 20 and the spiral bushing 24. At the opposite end of the sleeve 20 and bushing 24, remote from the radial passage 37, a sealing unit, generally designated 36, is provided and comprises an annular, resilient sealing ring 38, bearing against the end 24a (FIG. 5) of the bushing 24, and radially sandwiched between the sleeve 20 and the bearing pin 32 which it rotatably receives. The sealing ring 38, which may comprise rubber, is rectangular in cross section and is generally referred to as a "quad-ring." The sealing ring 38 prevents dirt and foreign matter from passing axially inwardly thereby. The ring 38 has a large external surface bearing against the inside of the sleeve 20 which prevents it from rolling when the bearing pin 32 is inserted into the spiral bushing 24 and the ring 38. To prevent the ring 38 from moving axially outwardly, a split, retaining or snap ring 40, having a gap 42, is received in an internal annular groove 44, provided at one end of the sleeve 20. One end 44a of the snap-ring 40 is radially stepped or reduced in thickness so that a tool (not shown) may be slipped over the end 44a to gain purchase and remove the snap ring 40 from the groove 44. The axially outer side wall of the annular groove 44 comprises a stop for inhibiting axial movement of the retaining ring 40 and the quad ring 38. As illustrated in FIG. 8, when lubricant L passes axially outwardly under pressure in the direction of the arrow o (FIG. 8), the sealing ring 38 will be radially compressed and axially bulged outwardly through the gap 42 so that the lubricant L will pass between the radially outermost portion 38' of the resilient ring 38, and the sleeve 20 after it has passed the full length of the spiral bushing 24.

Another sealing unit, generally designated 46, (FIG. 6) is received in an identical annular groove 44, provided in the sleeve 20, at the opposite end 24b of the bushing 24, and includes an identical quad-ring 38a in sealing engagement with the bearing pin 32 and a pair of snap-rings 40a which are identical to the snap-rings 40, except that they are each of axially reduced thickness. The gaps 42a (FIG. 7) in the snap-rings 40a are circumferentially staggered, so that the resilient quad-ring 38a cannot bulge axially sufficiently so that lubricant L can pass thereby. It is important to note that the internal diameter 40' of the rings 40 and 40a is slightly greater than the internal diameter 38d of the resilient sealing rings 38 so that the retaining rings 40 do not bear against the pin 32.

The sealing unit 46 thus prevents the axially outward passage of lubricant L introduced via the radial shaft passage 37. Since the lubricant L is introduced at one axial end of the bearing unit and can exit only via the sealing unit 36, in order to verify that the bearing pin 32 and the spiral bushing 30 are adequately lubricated, a mechanic need only observe when lubricant passes axially outwardly beyond the sealing unit 36.

The sleeve 20, bushing 24, and sealing units 36 and 46 are preassembled before being sent to the user. This assembled unit is then pressed into the shackle eye 16 with or without the bearing pin 32 being previously inserted in the bushing 28. The bearing pin, which is received in the spiral bushing 28 is then connected to the vehicle chassis C.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A bearing unit, comprising; a cylindrical shell receiving and having a bearing pin journalled therewithin, an enlarged diameter end portion within one end of said shell having a resilient annular seal received and retained therewithin for sealing engagement with the bearing pin, means for admitting lubricant internally of said seal retaining end portion, retaining rings means separably carried in said enlarged diameter end portion outboard of said seal for axially retaining said seal in said shell and in sealing engagement about the pin, and said ring means being formed to provide a gap between enclosing ends for the passage of lubricant under said seal and therethrough in the flushing and repacking of the unit with lubricant under pressure.

2. The bearing unit of claim 1, including: a bearing pin received in said shell and having a supply bore for receiving and passing lubricant from one end thereof to its peripheral surface between its respective ends, an annular seal and seal retaining means within said shell and about said pin at the end thereof opposite said enlarged diameter end portion, said last mentioned retaining means including rings having gaps between enclosing ends thereof staggered to preclude lubricant passage therethrough.

3. The bearing unit of claim 2, including; a spiral bushing comprising a spiral strip received in said shell and terminating short of the end thereof to provide said enlarged diameter end portion, a spiral groove provided in at least one of said bushing and pin for communication with said supply bore and providing lubricant along the external surface of said pin, and an internal annular groove provided in said shell outboard of said bushing and receptive of said retaining ring means therewithin.

4. The bearing unit of claim 3; said spiral bushing comprising a helical strip normally having an outside diameter greater than the internal diameter of said shell in which received and being sprung into engagement with the internal wall of said shell and thereby fixed and held in place.

5. The bearing unit of claim 4; said helical strip having the internal side edge portions thereof chamfered to provide said spiral groove.

6. A bearing unit, comprising; a cylindrical shell having an axial bore, a spiral bushing received in said bore and comprising a helical strip having an outside diameter greater than said bore for being sprung and retained in internal engagement therewith with its ends spaced from the ends of said bore, a bearing pin received within and fitted to said bushing and having a lubricant passage from one end thereof to its periphery and between its respective ends, sealing means provided in opposite ends of said shell and immediately next adjacent the ends of said spiral bushing for shoulder stop support, and seal retaining ring means engaged within said bore with said shell immediately outboard of said sealing means.

7. The bearing unit of claim 6, one of said seal retaining ring means including a snap ring having a gap provided between its enclosing ends for the unilateral passage of lubricant under pressure therethrough in the purging and packing of said lubricant passage.

8. The bearing unit of claim 6, said seal retaining ring means including snap rings having a gap provided between enclosing ends thereof, and the snap rings at one end of said bushing having the gaps therein staggered to preclude lubricant passage under said seal and therethrough and at the other end being disposed to permit passage under pressure therethrough.

9. A bearing unit comprising: cylindrical shell means including a bearing pin receiving portion for journalling a bearing pin; and an enlarged diameter, seal receiving end portion; means for admitting lubricant internally of said pin receiving portion; a resilient, annular seal, received by said enlarged diameter end portion for sealingly engaging said pin; retaining ring means, separably carried by said enlarged diameter end portion, axially retaining said annular seal; and means on said enlarged diameter portion for preventing axial movement of said retaining ring means in a direction away from said pin receiving portion, wherein the internal diameter of said retaining ring means is larger than the internal diameter of said annular seal, wherein said resilient annular seal is rectangular in cross section, including a bearing pin rotatably received by said bearing pin receiving portion and having a lubricant supply bore therein for passing lubricant from one end of said pin to the peripheral surface of said pin interjacent its ends and the ends of said bearing pin receiving portion so that lubricant can be introduced to a position between said pin and said pin receiving portion; said retaining ring means and said annular seal cooperating to prevent the passage of said lubricant axially outwardly thereby, said shell means comprises a sleeve defining said enlarged diameter end portion, and a spiral bushing comprising a spiral strip received by said sleeve and constituting said bearing pin receiving portion; spiral groove means is provided in at least one of said bushing and said bearing pin for axially passing lubricant along the external surface of said pin, said end portion comprising an internal annular groove in said sleeve axially outward of said bushing, said retaining ring means removably received by said groove.

10. A bearing unit comprising; shell means having an axial bore therein for journaling a bearing pin and including radially projecting axial stop means; resilient annular seal means disposed interiorly of said shell means for rotably receiving, and sealing to, said pin; and retaining ring means, axially inwardly of said stop means and axially outwardly of said annular seal means for axially retaining said annular seal means, wherein said shell means comprises a cylindrical sleeve, said stop means includes axial end wall means on said sleeve, the internal diameter of said retaining ring means being greater than the internal diameter of said annular seal means so as to be radially spaced from said pin, wherein an annular groove is provided in the internal wall of said sleeve, said end wall means comprising one end wall of said groove, wherein said seal means comprises a ring which is rectangular in cross section, and including a spiral bushing comprising a helical strip normally having an outside diameter greater than the internal diameter of said bore and being spring into engagement with the internal wall of said shell means and thereby held in place therein, said spiral bushing being disposed axially inwardly of said seal means.

11. The bearing as set forth in claim 10 wherein the adjacent, internal side edge portions of said strip are chamfered to provide spiral groove means for spirally passing lubricant along the length thereof.

12. Apparatus for mounting a member, such as a leaf spring or the like, on a support, such as a vehicle chassis, comprising:
  a cylindrical bearing sleeve, adapted to be fixed to said member, having an axial bore therethrough;
  a spiral bushing comprising a helical strip, normally having an outside diameter greater than the internal diameter of said bore, sprung into engagement with the internal wall of said sleeve and thereby held in place, the adjacent internal side edge portions of said helical strip being radially outwardly convergent to provide internal, spiral groove means for passing lubricant along the length thereof;
  a bearing pin rotatably received by said bushing and including an external groove of single-eight configuration cooperating with said internal groove means to pass lubricant along the length thereof;
  means for preventing lubricant from passing axially beyond one end of said sleeve including:
    annular, internal groove means in said sleeve at one end thereof;
    a pair of axially side-by-side, split, retaining rings each having a gap therein circumferentially spaced from the gap in the adjacent ring; and
    a resilient sealing ring of rectangular cross section bearing against said pin and sandwiched between one end of said bushing and the axially inner one of said split rings; and
  means for inhibiting the axially inward passage of foreign matter while permitting lubricant to pass axially outwardly past the opposite end of said sleeve including:
    annular internal groove means in said sleeve at said opposite end thereof;

a split retaining ring having a gap therein; and
a resilient sealing ring of rectangular cross section sandwiched between the opposite end of said bushing and said last mentioned ring and bearing against said shaft to prevent foreign matter from passing axially inwardly therebetween but being deformable at said gap to permit lubricant to pass axially outwardly thereby;

said shaft including an axial lubricant supply passage communicating with a radial passage communicating with said external groove.

* * * * *